United States Patent [19]

Sturm

[11] 3,974,375
[45] Aug. 10, 1976

[54] DEVICE FOR MEASURING THE IRRADIATION ENERGY IMPINGED UPON A TARGET WITHIN A FIXED PERIOD

[75] Inventor: Walter Sturm, Hanau-Hohe Tanne, Germany

[73] Assignee: Original Hanau Quarzlampen GmbH, Hanau am Main, Germany

[22] Filed: Jan. 30, 1975

[21] Appl. No.: 545,667

[30] Foreign Application Priority Data
Feb. 6, 1974 Germany............................ 2405567

[52] U.S. Cl................................ 250/206; 307/117; 250/214 R
[51] Int. Cl.² ........................................ H01J 39/12
[58] Field of Search.............. 250/206, 207, 214 R, 250/214 P; 307/117, 278; 356/215, 218, 225

[56] References Cited
UNITED STATES PATENTS

| | | | |
|---|---|---|---|
| 3,600,584 | 8/1971 | Schneble | 250/214 P |
| 3,626,825 | 12/1971 | Years | 250/214 P |
| 3,649,128 | 3/1972 | Rothschild et al. | 356/215 |
| 3,703,130 | 11/1972 | Watanabe | 250/206 X |
| 3,727,526 | 4/1973 | Hinds | 307/117 X |
| 3,790,789 | 2/1974 | Takahashi et al. | 250/214 P |

Primary Examiner—Walter Stolwein
Attorney, Agent, or Firm—Sughrue, Rothwell, Mion, Zinn & Macpeak

[57] ABSTRACT

A device for measuring the irradiation energy impinged upon a target within a fixed period, having a photo-electric receiver impacted by irradiation. Such devices have become known by the designation "Lux hour meter". They are used, e.g. for tests, by which the influence of irradiation energy on the properties of materials, e.g. textiles, shall be determined.

4 Claims, 1 Drawing Figure

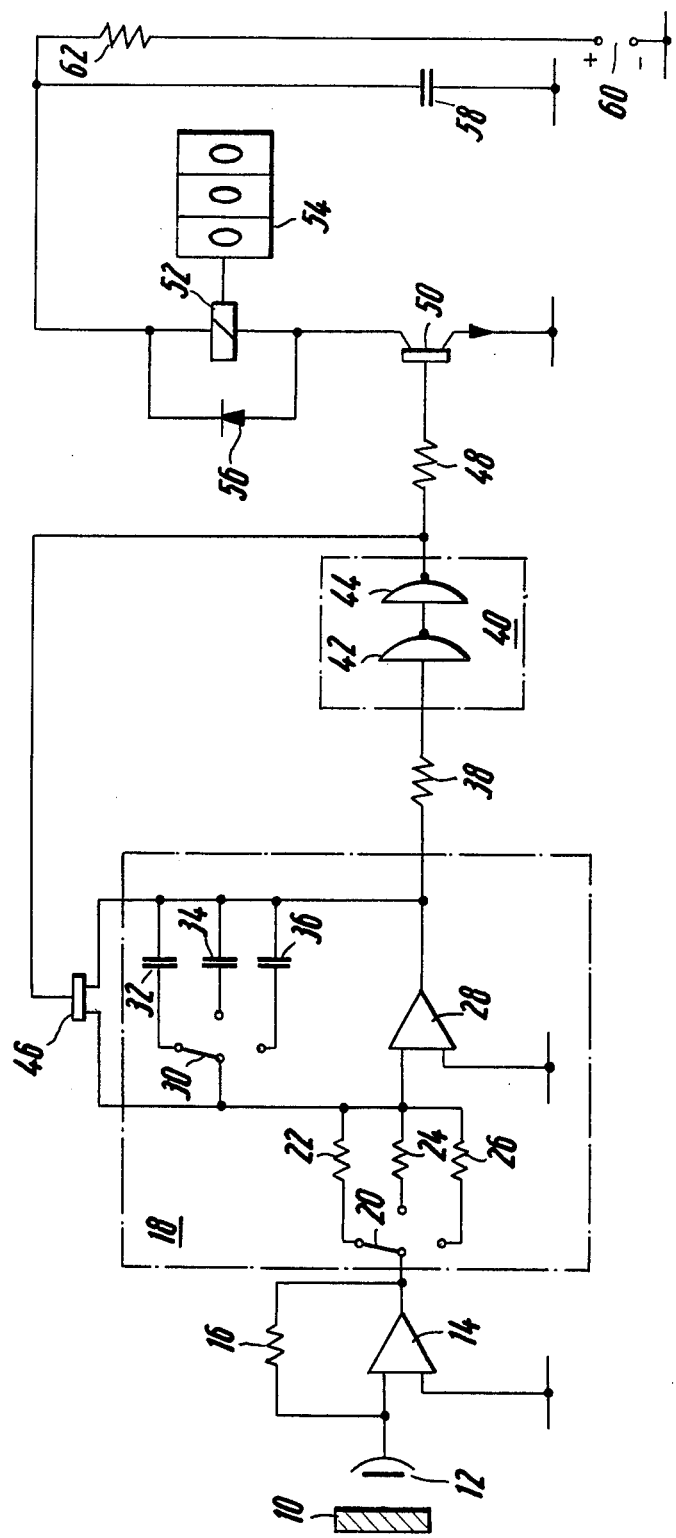

DEVICE FOR MEASURING THE IRRADIATION ENERGY IMPINGED UPON A TARGET WITHIN A FIXED PERIOD

Textiles frequently are submitted to these tests in order to test the light fastness of the colours used therefor. As these tests require extended periods of time, it must be reckoned with variations of the radiation intensity during the duration of the test. When using daylight for the irradiation by exposure to natural solar radiation, variations of daylight will show up. When using an artificial light source, variations of the luminous intensity will occur due to disturbance influences on the energy source or aging of the light source. By means of "Lux hour meters" the irradiation energy is determined independently of variations of the radiation intensity.

With a known "Lux hour meter", a photo-electric receiver is exposed to radiation of a light source, whereby the output of the receiver is used for separating mercury from an aqueous solution of electrolytes. Since the current output of the photo-electric receiver is proportional to the radiation intensity, the mass of mercury separated during a fixed time gives a measure for the irradiation energy. The known device requires careful handling, since in the event of mechanical damage thereto, the mercury might escape.

The invention is based on the problem to improve the initially mentioned device in such a manner that the irradiation energy can be exactly measured without using an electrolyte.

According to the invention, the problem is solved by connecting the receiver with an integrator, the output signal of which can be led to a threshold value circuit, and be reaction of the latter a counter can be impacted with a counter signal and the integrator can be reset on a value corresponding to the initial condition for the integration.

The device can be calibrated by adjusting the reaction threshold of the threshold value circuit. For this adjustment, no expensive measures are required. Thus it is a special advantage of the device that a calibration can be effected in a simple manner.

Further with this device, the measured quantity is indicated univocally and exactly, resulting in the advantage that reading errors will be avoided to a great extent. The device further is sensitive to rays situated in a large range of spectrum.

In view of the fact that the device includes only a few small components, it requires but little space. Therefore the device is easy to handle.

Preferably the spectral distribution of the radiation impinging upon the photo-electric receiver can be selected by a prearranged filter. Thereby the effect of rays of certain ranges of spectrum can be examined. It is likewise possible to select the photo-electric receiver in consideration of a range of spectrum desired for the measurement in such a manner that the spectral sensibility in this range has high values.

In a preferred embodiment it is provided that the integrator includes an amplifier, in the feed back branch of which via a selector, capacitors of different values can be connected with, as well as resistors of different resistance values, via another selector, in the input circuit of same. This arrangement makes it possible to change over to different measuring ranges. Thus the range of application of the measuring device is enlarged.

In a practical embodiment, a controllable control element is connected in parallel with the capacitors, which will be switched over to the conducting condition upon activation of the threshold value circuit. For a controllable switch element, a unijunction-transistor can be used, which is in a nonconducting condition during the period of integration. Thus the integration practically will not be influenced by the unijunction-transistor. Via the unijunction-transistor there can further be attained a quick equalization of the charges of each respective capacitor located in the feedback circuit, so that the period for charge equalization is very short as compared to the time available for the integration.

A favorable embodiment consists in the fact that a transistor is connected with the threshold value circuit at the outlet side of same, in the collector circuit of which a solenoid coil of an electromechanical counter is arranged. If the transistor is switched into the conductive condition, a current energizes the solenoid coil, whereby the counter steps forward for one unit.

In another preferred embodiment a capacitor is coupled in parallel with the series connection consisting of the transistor and the solenoid coil; the capacitor being connected with an electrical source of high internal resistance. When the transistor is blocked, the capacitor is charged up to the tension of the electrical source. The energy stored in the capacitor is available for the actuation of the counter. Therefore, the device can be loaded from an electrical source of small capacity. Since for the perfect operation of the device batteries or solar cells are sufficient, the device can be used in open air and at places where there is no electrical supply system.

The invention is more fully described in the following by means of a drawing showing an example of embodiment, from which further objects as well as advantages will be apparent.

The drawing presents a wiring diagram of a device for measuring the irradiation energy impinged upon a target within a fixed period. An optical filter 10 is lighted by a luminous source not shown on this drawing. A certain spectral range of the available radiation, e.g. of the sun light, as desired for the respective test, penetrates the filter 10. The filter 10 is coupled with a photo-electric receiver 12, on which the radiation impinges after having passed the filter 10. The photo-electric receiver 12 is connected to one input of a amplifier 14, while its second input is connected to a reference potential. Between the output of the amplifier 14 and the input connected to the receiver 12, there is switched in a feedback resistor 16 by means of which the degree of amplification is set.

The amplifier 14 feeds an integrator 18 provided with a selector-switch 20, of which the outlet coupled with the contact element is connected to the output of the amplifier 14. The selector-switch 20 can be switched over to three output connections not specified more fully, which are connected with the resistors 22, 24, 26. The second outlets of the resistors 22, 24, 26 are jointly connected with an input of an amplifier 28, the second input of which is connected to a reference potential. In addition thereto, a selector-switch 30, via an input connection, is connected with the joint outlet of the resistors 22, 24, 26. The selector-switch 30 is provided with three outputs not specified more fully, which are connected with capacitors 32, 34, 36. The second outlets of the capacitors 32, 34, 36 are jointly led to the output of the amplifier 28 feeding a threshold value switching 40 via a resistor 38, consisting of two gates 42, 44. The threshold value switching 40 is formed as a Schmitt-trigger.

Connected with the output of the threshold value switching 40 is the trigger electrode of a unijunction transistor 46 on the one hand, and on the other hand, via a resistor 48, the base of a transistor 50, in the collector circuit of which there is arranged a control coil 52 of an electro-magnetic impulse counter 54. Connected in parallel to the control coil 52 is a diode 56 polarized in locking direction with reference to the electrical source. The emitter of the transistor 50 is connected to reference potential. The serial circuit of the transistor 50 and of the control coil 52 is connected in parallel to a capacitor 58.

A tension source 60, provided with a high internal resistance 62, via its positive pole not specified more fully, supplies the junction point between the capacitor 50 and the control coil 52. The negative pole not specified more fully of the tension source 60 is connected to reference potential.

The unijunction transistor 46 with its source or falling line is switched in between the one input and the output of the amplifier 28.

The radiation impinging upon the receiver 12, at the output of the receiver 12, generates a current proportional to the irradiation intensity. Preferably a photovoltaic cell is used for the receiver 12, the spectral sensibility of which being adapted to the spectral range of transmission of the filter 10. The amplifier 14 generates a tension proportional to the current of the receiver 12, which will be integrated in the integrator 18. The integration time parameter is determined by the series connection of a resistor and a capacitor. By setting the selector switches 20 and 30 a resistor and a capacitor are connected with the input circuit and the feedback circuit of the amplifier 28.

By the integration of the output tension of the amplifier 14, the tension at the output of the amplifier 28 increases. As soon as the output tension of the amplifier 28 reaches the tension threshold as set in the threshold value switching 40, the threshold value circuit 40 emits an output signal, which energizes the unijunction transistor 46 as well as the transistor 50, to the conductive condition.

When the transistor 50 is conductive, a current runs from the tension source 60 and from the capacitor 58 over the control coil 52 of the counter 54. Thereby the counter 54 steps forward for one counting unit.

As soon as the unijunction transistor 46 becomes conductive, the capacitor, set via the selector switch 30, discharges within a short time. Thereby the output tension of the amplifier 28 falls until it reaches approximately the value prevailing at the input. Thereby the approach signal at the output of the threshold value circuit 40 stops. The unijunction transistor 46 and the transistor 50 are again put into non-conductive condition. After blocking the transistor 50, the current caused by the energy content of the coil 52 flows over the diode 56 until full decay.

Subsequently, the integration of the tension of the amplifier 14 recommences until the output tension of the amplifier 28 has again reached the value of the approach threshold of the switching 40. Then the stepping forward of the counter 54 for one counting unit is repeated, as well as making the unijunction transistor 46 conductive, thereby allowing the output tension of the amplifier 28 to fall and stop the signal to the threshold value circuit 40.

By the approach threshold of the switching 40 such quantity of irradiation energy is determined that corresponds to one counting unit of the counter 54. Thus the device shown on the drawing can be calibrated via the setting of the approach threshold. Calibration can be performed in a relatively simple manner.

The counter 54 indicates the measured value digitally. Thus reading errors are avoided to a far extent.

By means of selection of the resistors 22 thru 26 and the capacitors 32 thru 36 via the switches 20 and 30, different integration factors can be obtained. In this manner, there will result different measuring ranges. Therefore, the switching arrangement according to the drawing presents a large range of application.

Since the switching contains but a few small elements, it can be built up in a space-saving manner. This signifies an easy and simple handling.

The power consumption of the switching is insignificant. Merely when indexing the counter 54, the coil 52 needs a greater quantity of energy, which will be supplied by the capacitor 58. Therefore it is possible to feed the switching device by a battery or a solar cell. The power supply by means of a solar cell is especially favorable for open air applications.

The counter 54 indicates the entire irradiation energy transmitted to the receiver 12, from the beginning of an irradiation of the receiver 12 until the time when the counter is read.

Due to the little space required for the device, for testing purposes it can be installed in such a position that with regard to the radiation intensity, is by far corresponding with the position of objects, the behaviour of which under the influence of radiation is to be tested. Thereby reproduceable measurements will result.

What is claimed is:

1. A device for measuring the irradiation energy impinged upon a photo electric receiver comprising:
   a. a first amplifier (14) having an input connected to an output of the photo electric receiver;
   b. an integrator circuit comprising a second amplifier (28), a plurality of resistors of different values (22, 24, 26) connected in parallel to an input of said second amplifier, first switch means (20) connected to an output of the first amplifier and to the plurality of resistors such that said switch means connects one of the resistors into the circuit, a plurality of capacitors (32, 34, 36) having one terminal connected in parallel to an output of the second amplifier, and a second switch means (30) having one terminal connected to the input of the second amplifier and the other terminal selectively connectable to one of the plurality of capacitors;
   c. a controllable switch element (46) connected in parallel with the plurality of capacitors;
   d. a threshold value circuit means (40) having an input connected to the output of the second amplifier (28), said threshold value circuit means producing an output signal only when its input from the second amplifier reaches a predetermined level;
   e. an electrically acutated visually indicating counter means (52, 54);
   f. a source of electrical power (60) connected to the counter means;

g. an electrically actuated switch means (50) connected to the power source (60) in series with the counter means (54), and to the output of the threshold value circuit (40), such that upon receipt of a signal from said threshold value circuit, said switch means (50) complete the power source (60) counter means (54) circuit thereby actuating the counter means (54); and h. means connecting the controllable switch element (46) to the output of the threshold value circuit (40) such that upon receipt of a signal from the threshold value circuit, said controllable switch element (46) closes, thereby allowing one of the plurality of capacitors (32, 34, 36) to discharge rapidly, which reduces the output of the second amplifier (28) to reset the integrator circuit to its initial conditions.

2. The device of claim 1 further comprising an optical filter disposed in front of the photo-electric receiver to control the spectral range of radiation contacting the receiver.

3. The device of claim 1 further comprising a capacitor (58) connected to the power source (60) in parallel with the counter means (54).

4. The device of claim 1 wherein the counter means includes a digital read-out.

* * * * *